(12) United States Patent
Nonaka et al.

(10) Patent No.: US 10,346,706 B2
(45) Date of Patent: Jul. 9, 2019

(54) IMAGE PROCESSING DEVICE, IMAGE PROCESSING METHOD, AND NON-TRANSITORY STORAGE MEDIUM STORING IMAGE PROCESSING PROGRAM

(71) Applicant: OLYMPUS CORPORATION, Hachioji-shi, Tokyo (JP)

(72) Inventors: Osamu Nonaka, Sagamihara (JP); Kunio Yamamiya, Sagamihara (JP); Hiroshi Kodama, Hachioji (JP); Shinya Abe, Hachioji (JP); Yuichi Tsuchimochi, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 64 days.

(21) Appl. No.: 15/248,254

(22) Filed: Aug. 26, 2016

(65) Prior Publication Data

US 2016/0364622 A1 Dec. 15, 2016

Related U.S. Application Data

(63) Continuation of application No. PCT/JP2014/067579, filed on Jul. 1, 2014.

(30) Foreign Application Priority Data

Feb. 28, 2014 (JP) ................................ 2014-039221

(51) Int. Cl.
*G06K 9/32* (2006.01)
*H04N 1/387* (2006.01)
(Continued)

(52) U.S. Cl.
CPC ....... *G06K 9/3258* (2013.01); *G06K 9/00791* (2013.01); *H04N 1/3871* (2013.01);
(Continued)

(58) Field of Classification Search
CPC .. G06K 2209/01; G06K 9/4652; G06K 9/325; G06K 9/00523; G06K 9/3258;
(Continued)

(56) References Cited

U.S. PATENT DOCUMENTS 5,357,582 A * 10/1994 Lin ..................... G06K 9/00463
382/174
2002/0006220 A1 * 1/2002 Kohchi .............. G06K 9/00456
382/165

(Continued)

FOREIGN PATENT DOCUMENTS

JP 4199286 A 7/1992
JP 2003085535 A 3/2003

(Continued)

OTHER PUBLICATIONS

International Preliminary Report on Patentability mailed in corresponding International Patent Application No. PCT/JP2014/067579 dated Sep. 15, 2016, consisting of 7 pp. (English Translation Provided).

(Continued)

*Primary Examiner* — Kenny A Cese

(74) *Attorney, Agent, or Firm* — Volpe and Koenig, P.C.

(57) ABSTRACT

An imaging processing device includes an image acquisition unit, a character region estimation unit, and an output unit. The character region estimation unit determines a line indicating a direction in which characters are arranged with high probability in the acquired image and estimates a character region candidate in which characters are arranged with high probability. The output unit outputs information of the region estimated in the character region estimation unit. The character region estimation unit includes a vertical line detector, a horizontal line detector, a color distribution detector, and a character region candidate line determination unit. The image processing device includes an association (Continued)

imaging mode to cause a user to shoot an image of the character region candidate.

11 Claims, 17 Drawing Sheets

(51) Int. Cl.
    *H04N 5/232*     (2006.01)
    *H04N 9/04*     (2006.01)
    *G06K 9/00*     (2006.01)

(52) U.S. Cl.
    CPC ..... *H04N 5/23216* (2013.01); *H04N 5/23245* (2013.01); *H04N 9/045* (2013.01); *G06K 2209/01* (2013.01)

(58) Field of Classification Search
    CPC ............. G06K 9/00791; H04N 1/3871; H04N 5/23216; H04N 5/23245; H04N 9/045
    See application file for complete search history.

(56) References Cited

U.S. PATENT DOCUMENTS

| | | | | |
|---|---|---|---|---|
| 2004/0091153 | A1* | 5/2004 | Nakano | G06K 9/00228 382/228 |
| 2005/0201620 | A1* | 9/2005 | Kanamoto | G06K 9/2018 382/182 |
| 2005/0220349 | A1 | 10/2005 | Furuya | |
| 2007/0104389 | A1* | 5/2007 | Wells | G06K 9/346 382/274 |
| 2007/0133885 | A1* | 6/2007 | Jeong | G06K 9/00369 382/228 |
| 2011/0123115 | A1* | 5/2011 | Lee | G06K 9/036 382/185 |
| 2012/0224765 | A1* | 9/2012 | Kim | G06K 9/325 382/159 |

FOREIGN PATENT DOCUMENTS

| | | |
|---|---|---|
| JP | 2010028486 A | 2/2010 |
| JP | 2010231686 A | 10/2010 |
| JP | 2012022575 A | 2/2012 |

OTHER PUBLICATIONS

International Search Report issued in corresponding International Patent Application No. PCT/JP2014/067579 dated Sep. 16, 2014, consisting of 5 pp. (English Translation Provided)

Office Action mailed in corresponding Japanese Patent Application No. 2016-504984 dated Apr. 3, 2018, consisting of 6 pp. (English Translation Provided).

Office Action mailed in corresponding Chinese Patent Application No. 201480076455.X dated Jun. 22, 2018, consisting of 21 pp. (English Translation Provided).

\* cited by examiner

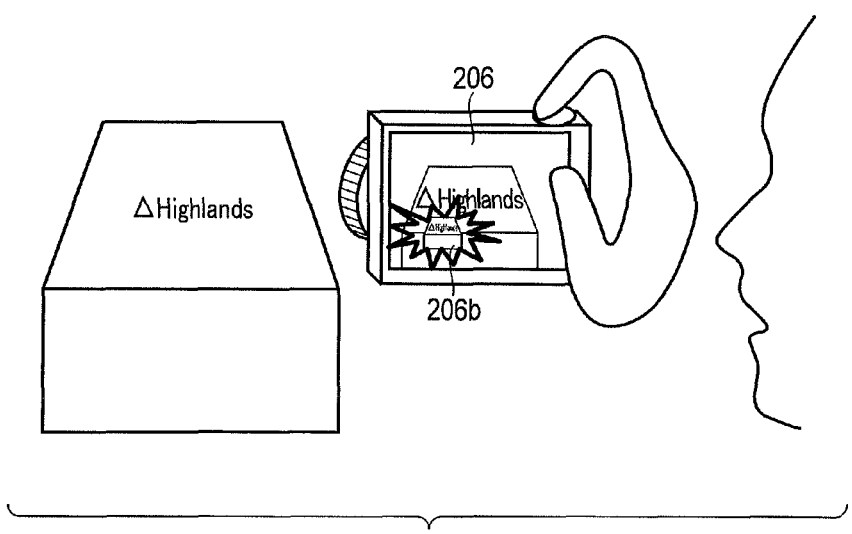
F I G. 3C

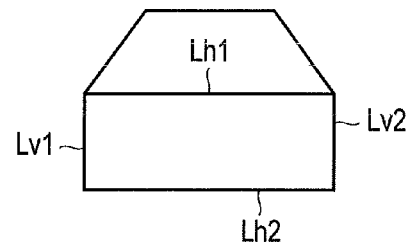
F I G. 7A
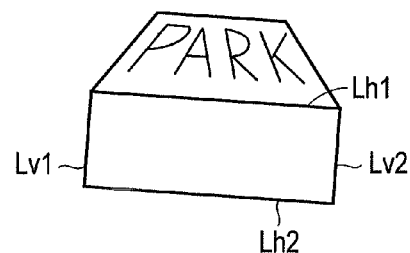
F I G. 7B
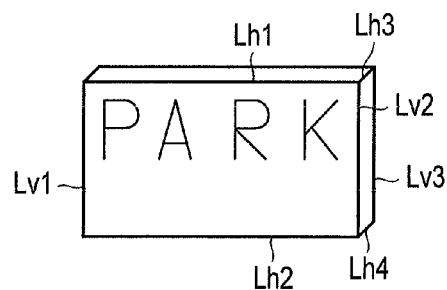
F I G. 7C

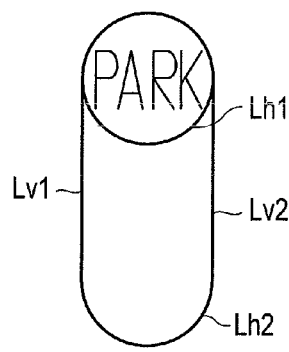
F I G. 7D
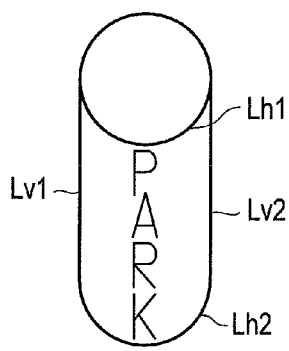
F I G. 7E
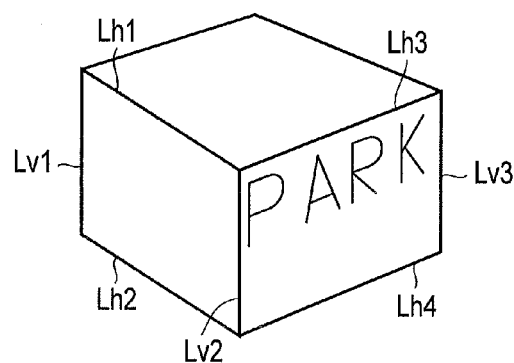
F I G. 7F

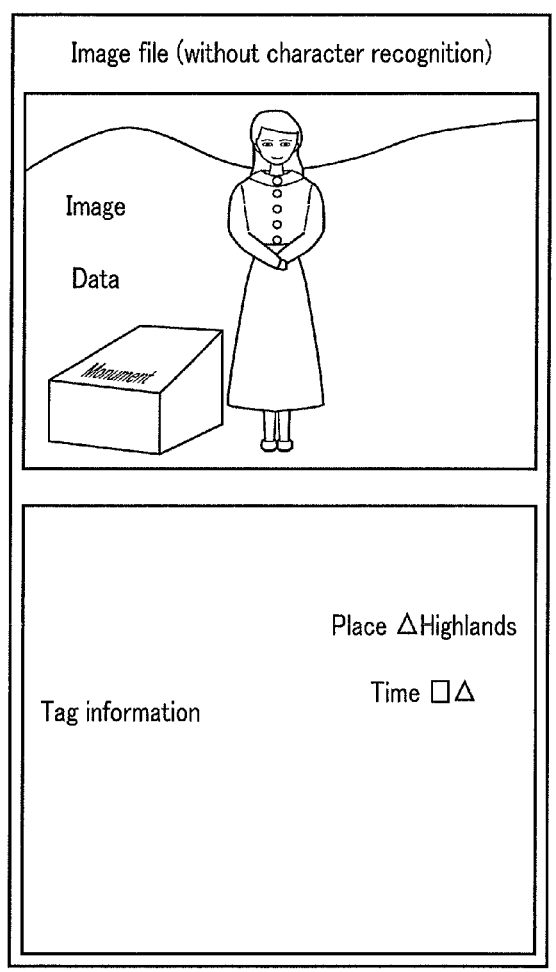
F I G. 10

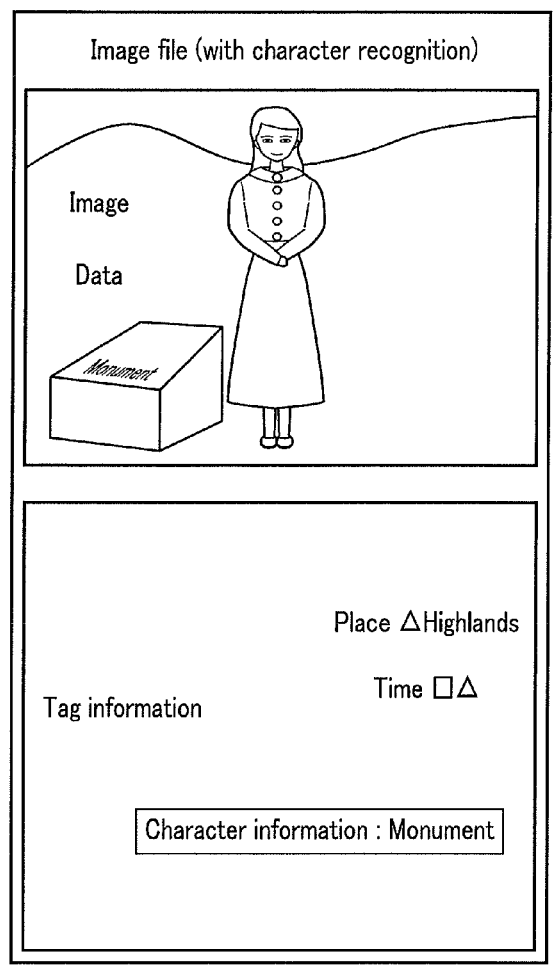
F I G. 11

IMAGE PROCESSING DEVICE, IMAGE PROCESSING METHOD, AND NON-TRANSITORY STORAGE MEDIUM STORING IMAGE PROCESSING PROGRAM

CROSS-REFERENCE TO RELATED APPLICATIONS

This application is a Continuation application of PCT Application No. PCT/JP2014/067579, filed Jul. 1, 2014 and based upon and claiming the benefit of priority from the prior Japanese Patent Application No. 2014-039221, filed Feb. 28, 2014, the entire contents of both of which are incorporated herein by reference.

BACKGROUND OF THE INVENTION

1. Field of the Invention

The present invention relates to an image processing device, an image processing method, and a non-transitory storage medium storing an image processing program.

2. Description of the Related Art

For example, Japanese Patent No. 4519531 presents a technique of reading characters in an image. For example, Japanese Patent No. 4519531 discloses a structure of extracting an object (including a character region) included in a still image according to priority, and processing the extracted object, such as providing the extracted object with visual effects or the like.

BRIEF SUMMARY OF THE INVENTION

According to a first aspect of the invention, an imaging processing device comprises: an image acquisition unit acquiring an image; a character region estimation unit determining a line indicating a direction in which characters are arranged with high probability in the acquired image as a character region candidate line, and estimating a region in which characters are arranged with high probability along the character region candidate line as a character region candidate; and an output unit outputting information of the character region candidate estimated in the character region estimation unit, the character region estimation unit including: a vertical line detector detecting a plurality of vertical lines in the image; a horizontal line detector detecting a plurality of horizontal lines in the image; a color distribution detector detecting color distribution between the detected vertical lines or color distribution between the detected horizontal lines; and a character region candidate line determination unit determining the character region candidate line based on the detected color distribution, the image processing device including an association imaging mode to cause a user to shoot an image of the character region candidate.

According to a second aspect of the invention, an image processing method comprises: determining a line indicating a direction in which characters are arranged with high probability in an acquired image as a character region candidate line, in an association imaging mode to cause a user to shoot an image of a character region candidate; estimating a region in which characters are arranged with high probability along the character region candidate line as the character region candidate; and outputting information of the estimated character region candidate, the determining the character region candidate line including: detecting a plurality of vertical lines in the image; detecting a plurality of horizontal lines in the image; detecting color distribution between the detected vertical lines or color distribution between the detected horizontal lines; and determining the character region candidate line based on the detected color distribution.

According to a third aspect of the invention, a non-transitory storage medium stores an image processing program to cause a computer to execute: determining a line indicating a direction in which characters are arranged with high probability in an acquired image as a character region candidate line, in an association imaging mode to cause a user to shoot an image of a character region candidate; estimating a region in which characters are arranged with high probability along the character region candidate line as the character region candidate; and outputting information of the estimated character region candidate, the determining the character region candidate line including causing the computer to execute: detecting a plurality of vertical lines in the image; detecting a plurality of horizontal lines in the image; detecting color distribution between the detected vertical lines or color distribution between the detected horizontal lines; and determining the character region candidate line based on the detected color distribution.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 3C is a third diagram illustrating an outline of operations of the imaging apparatus;

FIG. 7A is a first diagram illustrating an example of character region candidate lines;

FIG. 7B is a second diagram illustrating an example of character region candidate lines;

FIG. 7C is a third diagram illustrating an example of character region candidate lines;

FIG. 7D is a fourth diagram illustrating an example of character region candidate lines;

FIG. 7E is a fifth diagram illustrating an example of character region candidate lines;

FIG. 7F is a sixth diagram illustrating an example of character region candidate lines;

FIG. 10 is a diagram illustrating an example of an image file prepared in Step S110;

FIG. 11 is a diagram illustrating an example of an image file associated in Step S120;

DETAILED DESCRIPTION OF THE INVENTION

Figure 1:
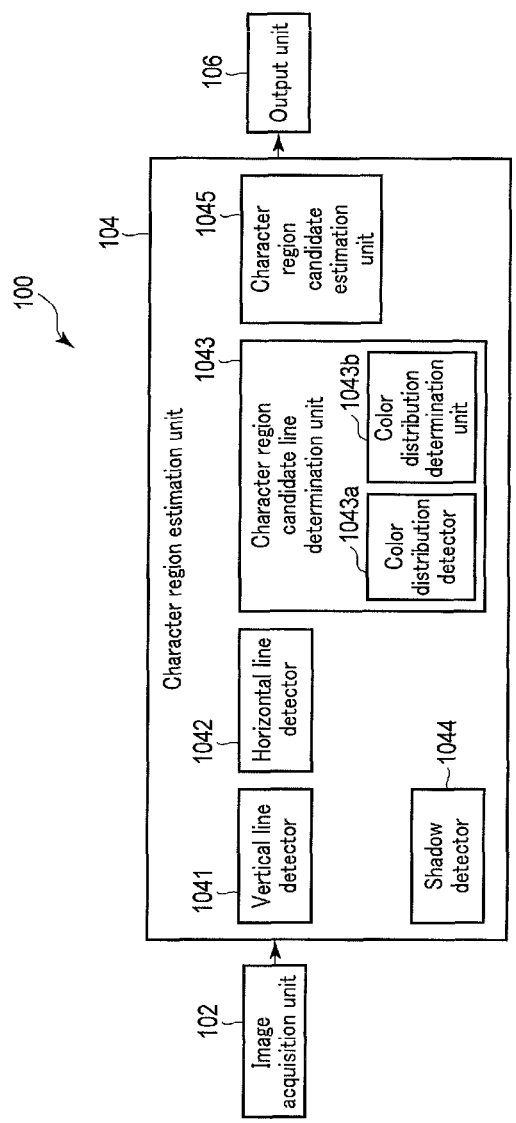
FIG. 1 is a functional block diagram of an image processing device according to an embodiment of the present invention.

An embodiment of the present invention will be explained hereinafter with reference to drawings. FIG. 1 is a functional block diagram of an image processing device according to an embodiment of the present invention. An image processing device 100 includes an image acquisition unit 102, a character region estimation unit 104, and an output unit 106.

The image acquisition unit 102 acquires an image serving as a target in which a region including characters is determined. The image acquisition unit 102 acquires an image obtained by imaging by an imaging unit, for example. As another example, the image acquisition unit 102 may be configured to acquire an image input from an external device outside the image processing device 100.

The character region estimation unit 104 estimates a region that is estimated to include characters in the image (it may not be determined whether the candidate characters are actually characters, at this point in time) input from the image acquisition unit 102. The character region estimation unit 104 includes a vertical line detector 1041, a horizontal line detector 1042, a character region candidate line determination unit 1043, a shadow detector 1044, and a character region candidate estimation unit 1045. The vertical line detector 1041 detects a plurality of vertical lines in the image. The horizontal line detector 1042 detects horizontal lines in the image. The character region candidate line determination unit 1043 determines lines indicating a direction in which characters are arranged with high probability, as character region candidate lines, based on a relation between the vertical lines in the image or relation between the horizontal lines in the image. The character region candidate line determination unit 1043 has a function as a color distribution detector 1043a, and a function as a color distribution determination unit 1043b. The function as the color distribution detector 1043a is a function of detecting color distribution between the vertical lines and the horizontal lines. The function as the color distribution determination unit 1043b is a function of determining whether the color distribution is a substantially uniform color distribution. The shadow detector 1044 detects shadow distribution in the image. The character region candidate estimation unit 1045 estimates a region (character region candidate) estimated to include characters, based on the shadow distribution in the direction along the character region candidate lines.

The output unit 106 outputs information of the character region candidate estimated in the character region candidate estimation unit 1045 of the character region estimation unit 104, to a display or the like. The information is, for example, coordinates of the character region candidate.

Figure 2:
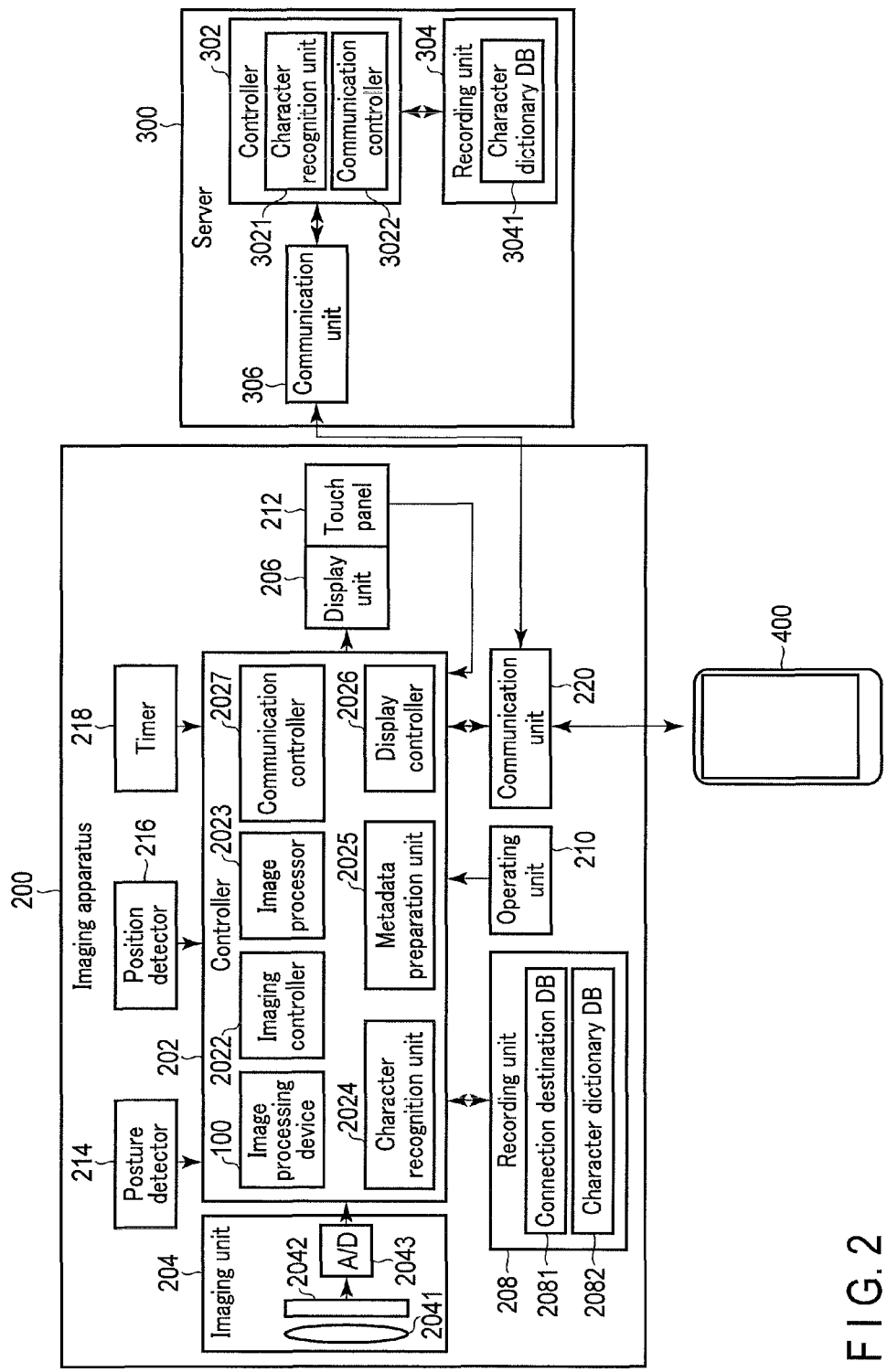
FIG. 2 is a diagram illustrating a configuration in the case where the image processing device according to an embodiment of the present invention is applied to an imaging apparatus.

FIG. 2 is a diagram illustrating a structure in the case where the image processing device 100 illustrated in FIG. 1 is applied to an imaging apparatus. An imaging apparatus 200 illustrated in FIG. 2 includes a controller 202, an imaging unit 204, a display unit 206, a recording unit 208, an operating unit 210, a touch panel 212, a posture detector 214, a position detector 216, a timer 218, and a communication unit 220. The imaging apparatus 200 illustrated in FIG. 2 is a type of apparatus with an imaging function, such as a digital camera or smartphone.

The controller 202 includes a CPU, for example. The controller 202 includes the image processing device 100 illustrated in FIG. 1. In addition, the controller 202 includes an imaging controller 2022, an image processor 2023, a character recognition unit 2024, a metadata preparation unit 2025, a display controller 2026, and a communication controller 2027. The imaging controller 2022 controls imaging operations performed by the imaging unit 204. The image processor 2023 performs image processing necessary for display and recording on the image data acquired by the imaging unit 204. The image processing includes correction relating to image quality, such as white balance correction, gradation correction, and color correction, resiting, compression processing, and expansion processing. The character recognition unit 2024 recognizes characters in the image data, with reference to a character dictionary DB 2082. The metadata preparation unit 2025 prepares metadata to be added to an image file, based on a recognition result of the character recognition unit 2024. The display controller 2026 controls display of various images on the display unit 206. The communication controller 2027 performs control in communications between the imaging apparatus 200 and the external apparatus. With the communication controller 2027, the imaging apparatus 200 is connected to a server 300 to perform communications as desired. By control of the communication controller 2027, the imaging apparatus 200 is also connected to another terminal device (smartphone) 400 to perform communications as desired.

The imaging unit 204 images a subject, and acquires an image (image data) related to the subject. The imaging unit 204 includes an imaging lens 2041, an imaging element 2042, and an analog/digital (A/D) converter 2043. The imaging lens 2041 condenses luminous flux from the subject to the imaging element 2042. The imaging element 2042 includes a light-receiving surface. Pixels are arranged on the light-receiving surface. The pixels are, for example, photodiodes, and output an electric signal (image signal) in accordance with a light amount of the incident light. The A/D converter 2043 converts an analog image signal obtained by the imaging element 2042 into a digital image signal (image data).

The display unit 206 is, for example, a liquid crystal display or an organic EL display, and displays an image based on image data of various types. The image data is image data obtained by imaging performed by the imaging unit 204, or image data recorded on the recording unit 208.

The recording unit 208 is, for example, a flash memory, and records image data and the like as files. The recording unit 208 includes a connection destination database (DB) 2081 and a character dictionary (DB) 2082 that are constructed therein. The connection destination DB 2081 is a database that stores address information and the like necessary for communicating with an apparatus (such as the server 300 and the terminal device 400) to communicate with the imaging apparatus 200. The character dictionary DB 2082 is a database that stores information of character patterns for character recognition. The recording unit 208 may be included in the imaging apparatus 200, or may be attachable to and detachable from the imaging apparatus 200.

The operating unit 210 is a mechanical operating member for the user to perform an operation of the imaging apparatus 200. The operating unit 210 includes, for example, a release button and a power switch. The release button is a button for the user to instruct execution of an imaging operation. The power switch is a switch for the user to instruct turning the power of the imaging apparatus 200 on and off.

The touch panel 212 is formed on a display screen of the display unit 206, and detects a user's touch operation. The controller 202 performs processing corresponding to the touch operation detected by the touch panel 212. For example, the touch panel 212 is used instead of a release button. The touch panel 212 is also used for the user to designate a specific portion of the image displayed on the display screen of the display unit 206.

The posture detector 214 is, for example, a triaxial acceleration sensor. The posture of the imaging apparatus 200 is detected. For example, in a standard posture (lateral position), a horizontal direction of the imaging apparatus 200 is an X direction; a positive Y direction thereof is a right direction when the imaging apparatus 200 is viewed from the subject side; the vertical direction of the imaging apparatus 200 is a Y direction; and a positive Y direction is an upper direction in the standard posture. In such a coordinate system, a roll is a rotational movement around a Z axis (optical axis of the imaging lens 2014), a positive-direction rotation of a pitch is a rotational movement around the X axis, a positive-direction rotation of a roll is left rotation around the Z axis as viewed in the X-axis positive direction from the origin, and a positive-direction rotation of a yaw is right rotation around the Y axis as viewed in the Y-axis positive direction from the origin. The position detector 216 includes, for example, a GPS (Global Positioning System) included in the main body of the imaging apparatus 200, or attached to a hot shoe (not illustrated). The position detector 216 detects a current position of the imaging apparatus 200, by receiving a signal transmitted from the outside by the GPS, or receiving GPS communication information transmitted from a terminal device such as a smartphone. The position detector 216 may be configured to detect the direction, based on the optical axis direction of the imaging lens 2014 in the imaging apparatus 200. As another example, a GPS log recorded by a terminal device such as a smartphone may be transferred to the imaging apparatus 200, to additionally record a GPS tag to Exif information of the image data stored in the imaging apparatus 200. The timer 218 obtains the current time. The communication unit 220 communicates with the server 300 and/or the terminal device 400, in accordance with the control of the communication controller 2027. The communication performed by the communication unit 220 may be wired communication or wireless communication.

The server 300 includes a controller 302, a recording unit 304, and a communication unit 306. The server 300 in FIG. 1 may be a cloud server. For example, the controller 302 and the recording unit 304 may be arranged in separate positions.

The controller 302 includes a character recognition unit 3021 and a communication controller 3022. The character recognition unit 3021 recognizes characters within a character region candidate in the image data acquired by communication from the imaging apparatus 200. The communication controller 3022 performs control in communication with the imaging apparatus 200.

The recording unit 304 is, for example, a hard disk. A character dictionary database (DB) 3041 is constructed in the recording unit 304. The character dictionary DB 3041 is a database storing character shape information for character recognition. The character dictionary DB 3041 may be a database having a higher amount of information than that of the character dictionary DB 2082.

The communication unit 306 communicates with the imaging apparatus 200, in accordance with control of the communication controller 3022.

Figure 3A:
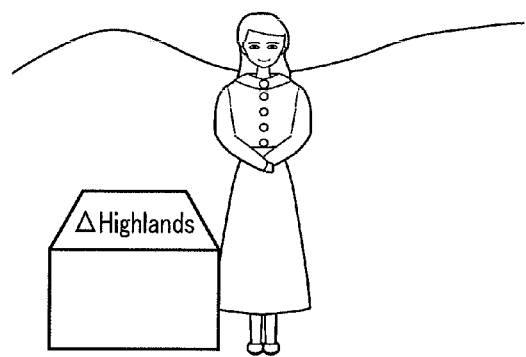
FIG. 3A is a first diagram illustrating an outline of operations of the imaging apparatus.

The following is an explanation of operations of the imaging apparatus 200 including the image processing device 100 according to the present embodiment. The imaging apparatus 200 of the present embodiment is suitable for imaging of a scene including a subject with characters, such as a signboard. For example, suppose that the user is going to image a stone monument with characters "X Highlands" as illustrated in FIG. 3A. In the imaging, the imaging apparatus 200 (image processing device 100) estimates a character region candidate in an image acquired by the imaging. The estimation will be explained in detail later.

Figure 3B:
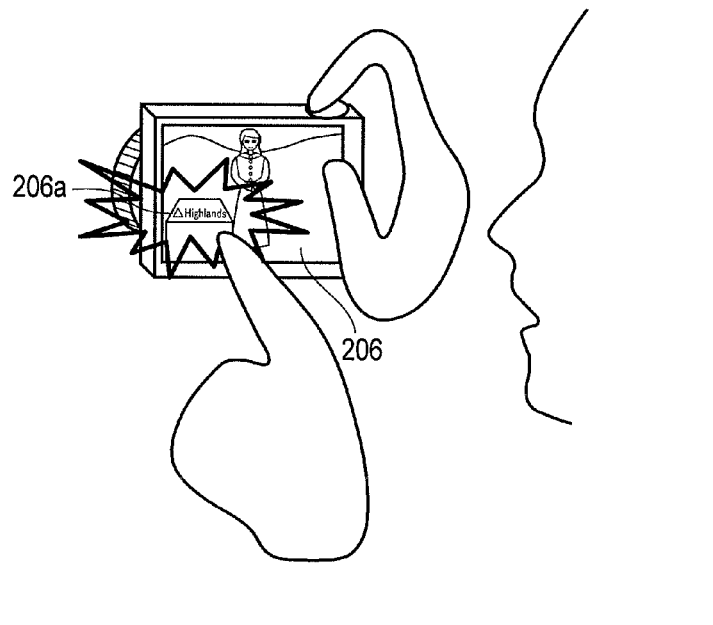
FIG. 3B is a second diagram illustrating an outline of operations of the imaging apparatus.

When a character region candidate is estimated, as illustrated in FIG. 3B, a character region candidate portion 206a in the image displayed on the display unit 206 is displayed in an emphasized state (for example, enclosed with a frame). When character recognition has been finished in this state, a character recognition result may be presented to the user.

The emphasized display causes the user to carefully observe the character region candidate portion. Thereafter, the user, who has recognized that characters exist in the character region candidate, issues an imaging instruction by touching the display screen (that is, the touch panel 212) of the display unit 206 or the like, as illustrated in FIG. 3B. In this manner, imaging by the imaging apparatus 200 is performed, and thereafter an association guide 206b is displayed in a live-view image, as illustrated in FIG. 3C. The association guide 206b is, for example, a reduced image of the character region candidate portion. The association guide 206b as described above causes the user to recognize the existence of characters in the scene, and prompts the user to image the stone monument.

Figure 4A:
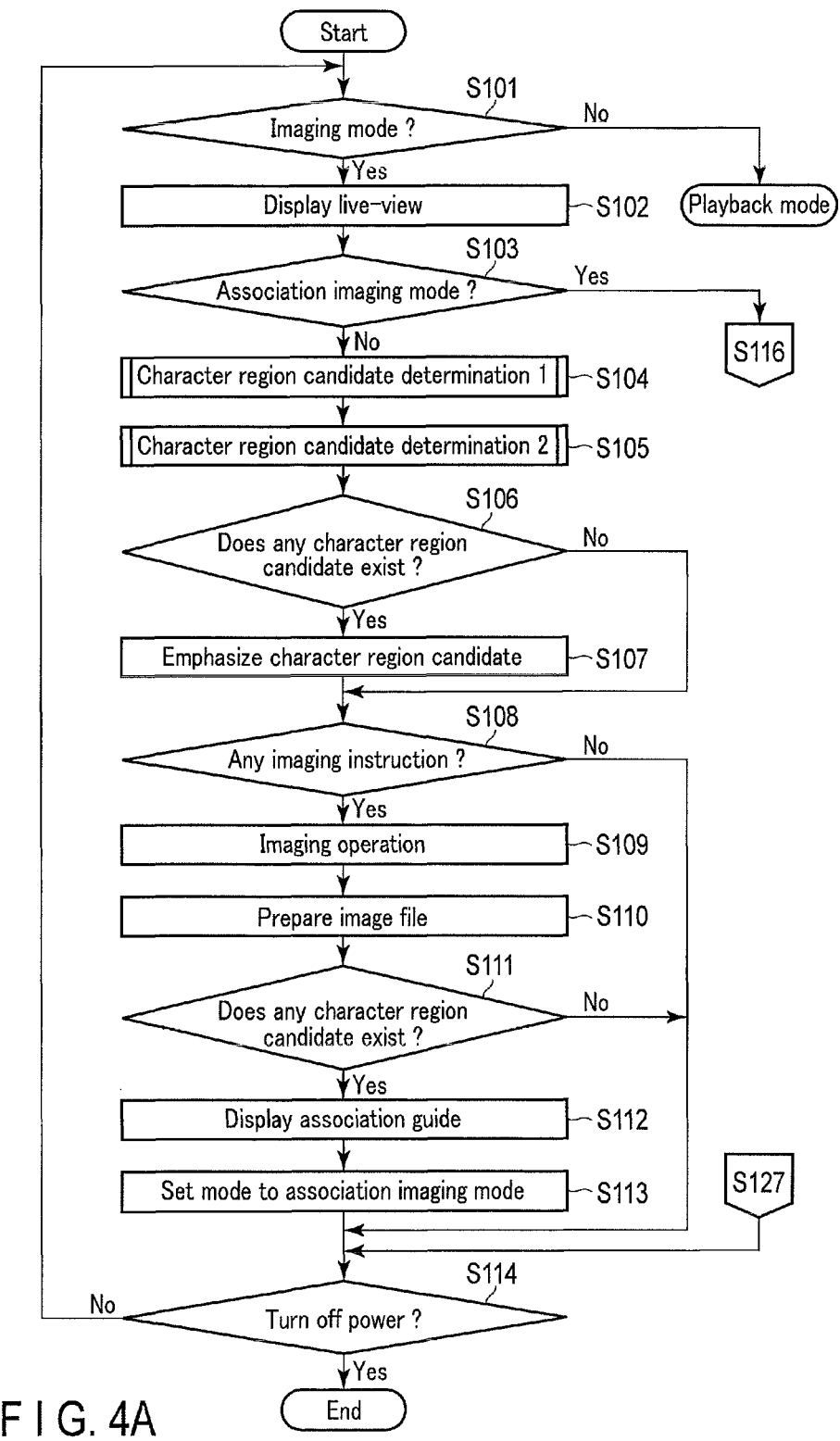
FIG. 4A is a first flowchart illustrating imaging operations of the imaging apparatus according to an embodiment of the present invention.
Figure 4B:
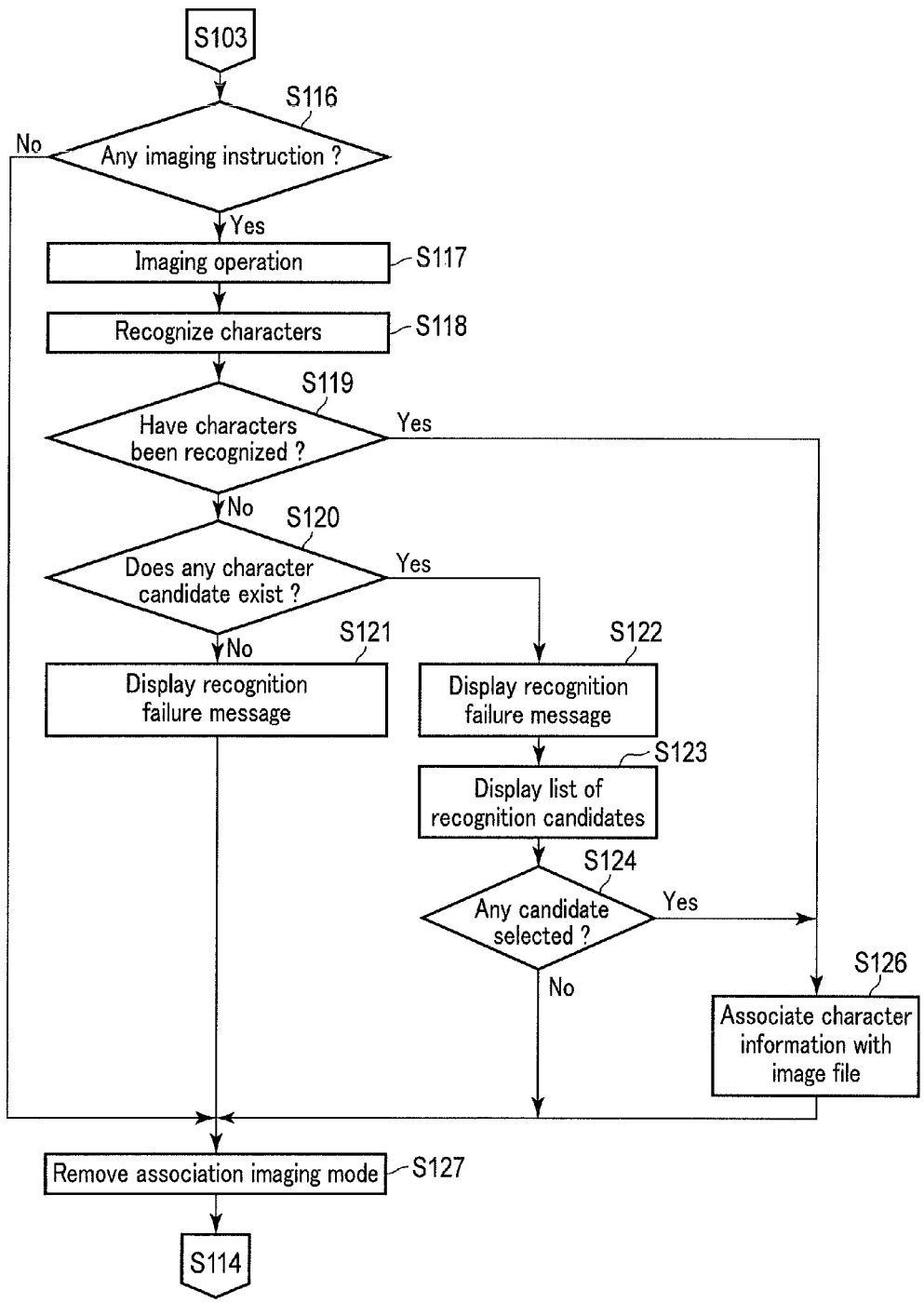
FIG. 4B is a second flowchart illustrating the imaging operations of the imaging apparatus according to an embodiment of the present invention.

FIG. 4A and FIG. 4B are flowcharts illustrating imaging operations of the imaging apparatus 200 according to the present embodiment. The operations illustrated in FIG. 4A and FIG. 4B are controlled by the controller 202. In FIG. 4A and FIG. 4B, the controller 202 determines whether the operating mode of the imaging apparatus 200 is an imaging mode (Step S101). The imaging apparatus 200 includes at least an imaging mode and a playback mode, as the operating modes. The imaging mode is an operating mode to shoot an image for recording. The playback mode is an operating mode to play back the recorded image. When the controller 202 determines that the operating mode of the imaging apparatus 200 is the playback mode in Step S101, the controller 202 performs processing for the playback mode. The processing for the playback mode will be briefly explained hereinafter. In the playback mode, the controller 202 displays a list of image files stored in the recording unit 208 on the display unit 206. When the user selects a desired image file among the image files displayed as a list, the controller 202 displays an image corresponding to the selected image file on the display unit 206.

In step S101, when the controller 202 determines that the operating mode is the imaging mode, the controller 202 executes a live-view display (Step S102). The live-view display is an operation of displaying images obtained by continuous operations of the imaging unit 204 on the display unit 206 in real time. Face detection or the like may be performed during the live-view display. After the live-view display, the controller 202 determines whether the current setting of the imaging mode is an association imaging mode (Step S103). The association imaging mode is an imaging mode to prompt the user to image a subject including characters. The details of the mode will be explained later.

In Step S103, when the controller 202 determines that the current setting of the imaging mode is not the association imaging mode, the controller 202 performs processing of character region candidate determination 1 (Step S104). The processing of character region candidate determination 1 is processing to determine character region candidate lines. The following is an explanation of the processing of character region candidate determination 1.

Figure 5A:
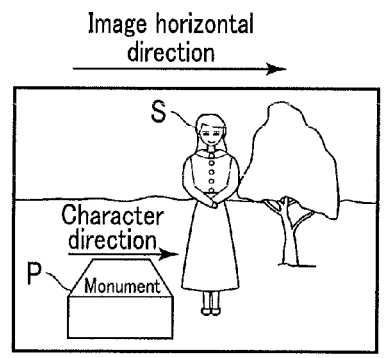
FIG. 5A is a first diagram illustrating an outline of processing of character region candidate determination 1.
Figure 5B:
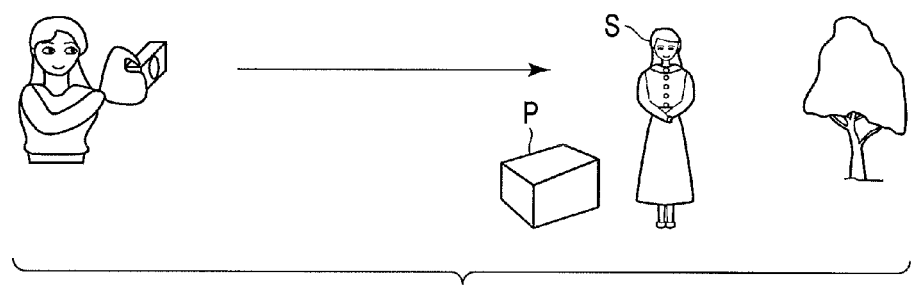
FIG. 5B is a second diagram illustrating an outline of the processing of character region candidate determination 1.

As illustrated in FIG. 5A, for example, characters are easily recognized when the characters in the image acquired in the live-view display are arranged in parallel with the horizontal direction or the vertical direction of the image. Herein, the signboard or the like is not always disposed horizontally with respect to the person. In addition, characters are not always arranged horizontally or vertically with respect to the image, in some compositions determined by the user. For example, as illustrated in FIG. 5B, in a scene in which the person S serving as the subject is positioned obliquely by the side of the stone monument P, the characters are inclined with respect to the horizontal direction and the vertical direction of the image, and character recognition becomes difficult. However, when the horizontal or vertical direction of the stone monument can be determined, the apparatus is enabled to estimate that characters may be arranged in the direction.

Figure 5C:
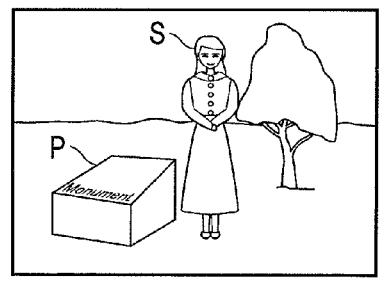
FIG. 5C is a third diagram illustrating an outline of the processing of character region candidate determination 1.

The imaging apparatus 200 according to the present embodiment presents information of a character region candidate considered to be a region in which characters exist to the user, even in a situation in which characters cannot be recognized, to advise the user to image the characters from a proper direction, if necessary. For example, as illustrated in FIG. 5C, even when the characters are not horizontal with respect to the image, the imaging apparatus 200 determines that a region (stone monument in the example of FIG. 5C) in which characters are inscribed is a character region candidate, as long as the region is horizontal with respect to the ground. In such a case, the imaging apparatus 200 advises the user of existence of a character region candidate.

Figure 6:
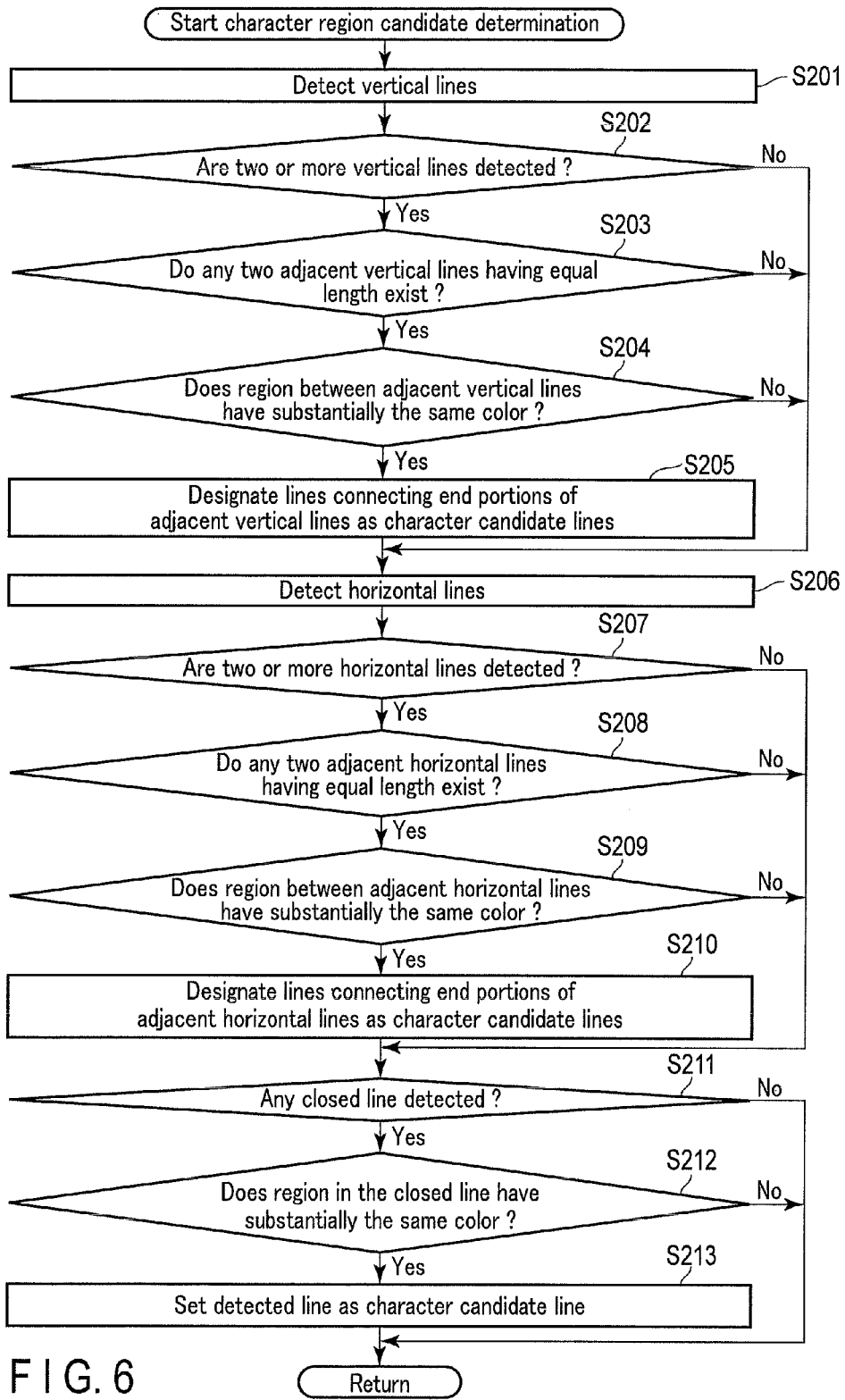
FIG. 6 is a flowchart illustrating the processing of character region candidate determination 1.

FIG. 6 is a flowchart illustrating processing of character region candidate determination 1. The processing of FIG. 6 is performed by the image processing device 100 of the controller 202. In FIG. 6, the image acquisition unit 102 acquires image data acquired by imaging for live-view display, and inputs the acquired image data to the character region estimation unit 104. The vertical line detector 1041 of the character region estimation unit 104 detects vertical lines in the input image data (Step S201). The vertical lines detected in Step S201 are desirably lines vertical to the ground. Accordingly, a line (the horizon) parallel with the ground in the image data is detected from the posture of the imaging apparatus 200 detected by the posture detector 214, and lines vertical to the horizon as vertical lines. The vertical lines can be detected using a well-known method, such as edge detection and corner detection.

After vertical line detection, the vertical line detector 1041 determines whether two or more vertical lines are detected (Step S202). Signboards and stone monuments serving as character region candidates in the image have shapes of various types, such as rectangular-parallelepiped shapes as illustrated in FIG. 7A, FIG. 7B, and FIG. 7F, a flat-plate shape as illustrated in FIG. 7C, and cylindrical shapes as illustrated in FIG. 7D and FIG. 7E. In addition, characters are inscribed in various positions, such as an upper surface and a side surface. However, when it is viewed as an image, a region considered to be a character region candidate is a closed region. The processing of Step S202 is processing to search for vertical lines of a character region candidate serving as a closed region. Two or more vertical lines are detected to search for a closed region serving as a character region candidate. By the processing of Step S202, vertical lines Lv1 and Lv2 are detected in the examples of FIG. 7A, FIG. 7B, FIG. 7D, and FIG. 7E. In the examples of FIG. 7C and FIG. 7F, vertical lines Lv1, Lv2, and Lv3 are detected. As described above, in imaging of a scene including a signboard or the like as illustrated in FIG. 7A to FIG. 7F, detection of two or more vertical lines are determined in Step S202.

In Step S202, when the vertical line detector 1041 determines detection of two or more vertical lines in the image data acquired in live-view imaging, the character region candidate line determination unit 1043 compares the lengths of the vertical lines detected by the vertical line detector 1041. The character region candidate line determination unit 1043 determines whether the vertical lines include two adjacent vertical lines having equal length (Step S203). In the example of the present embodiment, when the vertical lines include two adjacent vertical lines having equal length, it is considered that the region between the two vertical lines may include characters, as illustrated in FIG. 7A to FIG. 7F.

In the processing, the character region candidate line determination unit 1043 detects a color of the region (color information signal: saturation and hue) between the two adjacent vertical lines, from the image data acquired in live-view imaging. As means for detecting the color information of the region, for example, only two color difference signal (Cr, Cb) components are extracted, among a brightness signal component (Y) and two color difference signal (Cr, Cb) signals included in the image data acquired in live-view imaging.

The two color difference signals (Cr, Cb) described above are output values obtained by subtracting a brightness signal component (Y) from the R signal and B signal outputs, respectively, with respect to image signal outputs (R signal, G signal, and B signal) of three primal colors of R, G, and B obtained from the imaging element. The first color difference signal (Cr) is an output value obtained by subtracting the brightness signal component (Y) from the R signal output. The second color difference signal (Cb) is an output value obtained by subtracting the brightness signal component (Y) from the B signal output.

When the first color difference signal (Cr) and the second color difference signal (Cb) serve as horizontal and vertical vector amounts, respectively, the saturation of the color information is indicated by a size of the vector formed of the two color difference signals. As the size of the vector formed of the two color difference signals increases, the saturation of the color information indicates brighter colors. In addition, hue information is detected as the color information, with the direction of the vector formed of the two color difference signals. Hue indicates tone.

The direction of the vector formed of the two color difference signals is indicated by calculating an intensity ratio of the first color difference signal (Cr) to the second color difference signal (Cb).

Specifically, when the first color difference signal (Cr) has a larger value than the second color difference signal (Cb) in ratio, the color information of the image data acquired in live-view imaging indicates a reddish color. By contrast, when the first color difference signal (Cr) has a smaller value than the second color difference signal (Cb) in ratio, the color information of the image data acquired in live-view imaging indicates a bluish color. In addition, the character region candidate line determination unit 1043 calculates an average output value of the color difference signals, or an average output value of the color difference signal corresponding to the region of the largest area, as a representative value of the color of the region between the two adjacent vertical lines.

The character region candidate line determination unit 1043 determines whether the color of the region between the two adjacent vertical lines is substantially the same color (Step S204).

In the color determination in Step S204, specifically, the first color difference signal (Cr) and the second color difference signal (Cb) are calculated from the image data of the regions indicated in comparison determination. Thereafter, saturation information and hue information are detected from each of the calculated first color difference signal (Cr) and the second color difference signal (Cb).

Determination in Step S204 as to whether the color of the region between the two vertical lines is substantially the same color is determined by comparing the values of each of the saturation information and the hue information, to determine whether the values have a large difference.

As a specific example, in the case where the region is a signboard or a stand (such as a stone monument), the portion thereof other than a portion of characters is considered to have substantially the same color (for example, the region between the vertical line Lv1 and the vertical line Lv2 in FIG. 7A has substantially the same color). Accordingly, when the color of the region between the two adjacent vertical lines is substantially the same color (specifically, the hue and saturation are detected from the color difference signal, and it is detected that the color of the region is substantially the same color when a difference from the hue and saturation of the color to be compared is smaller than a predetermined range), it is considered that the region between the two vertical lines may include characters. In this case, the character region candidate line determination unit 1043 regards lines (straight lines or curved lines) connecting end portions of the two adjacent vertical lines as character region candidate lines (Step S205). For example, in the example of FIG. 7A, lines Lh1 and Lh2 that connect end portions of the vertical line Lv1 with end portions of the vertical line Lv2 are regarded as character region candidate lines.

After Step S205, or when in Step S202 the vertical line detector 1041 determines that two or more vertical lines are not detected, when in Step S203 the character region candidate line determination unit 1043 determines that the vertical lines do not include two adjacent vertical lines having equal length, or when in Step S204 the character region candidate line determination unit 1043 determines that the color of the region between the two adjacent vertical lines is not substantially the same color, the horizontal line detector 1042 detects a horizontal line in the input image data (Step S206). The horizontal line can be detected using a well-known outline detection method in object detection, such as edge detection and corner detection.

After detection of the horizontal line, the horizontal line detector 1042 determines whether two or more horizontal lines are detected (Step S207). In Step S207, when the horizontal line detector 1042 determines that two or more horizontal lines are detected, the character region candidate line determination unit 1043 compares the lengths of the horizontal lines detected by the horizontal line detector 1042. Thereafter, the character region candidate line determination unit 1043 determines whether the horizontal lines include two adjacent horizontal lines having equal length (Step S208). In Step S208, when the character region candidate line determination unit 1043 determines that the horizontal lines include two adjacent horizontal lines having equal length, the character region candidate line determination unit 1043 detects the color of the region between the two adjacent horizontal lines. Thereafter, the character region candidate line determination unit 1043 determines whether the color of the region between the two adjacent horizontal lines is substantially the same color (specifically, the hue and saturation are detected from the color difference signal, and it is detected that the color of the region is substantially the same color when a difference from the hue and saturation of the color to be compared is smaller than a predetermined range) (Step S209). In Step S209, when the character region candidate line determination unit 1043 determines that the color of the region between the two adjacent horizontal lines is substantially the same color, the character region candidate line determination unit 1043 regards lines (straight lines or curved lines) connecting end portions of the two adjacent horizontal lines as character region candidate lines (Step S210). For example, in the example of FIG. 7A, lines Lv1 and Lv2 that connect end portions of the horizontal line Lh1 with end portions of the horizontal line Lh2 are regarded as character region candidate lines.

After Step S210, or when in Step S207 the horizontal line detector 1042 determines that two or more vertical lines are not detected, when in Step S208 the character region candidate line determination unit 1043 determines that the horizontal lines do not include two adjacent horizontal lines having equal length, or when in Step S209 the character region candidate line determination unit 1043 determines that the color of the region between the two adjacent horizontal lines is not substantially the same color, the character region candidate line determination unit 1043 determines whether a closed line (a region enclosed by straight lines or curved lines) in the image data is detected (Step S211). The closed line is detected from the shape of the edges extracted by the vertical line detector 1041 and the horizontal line detector 1042, or the like.

When a closed line is detected in Step S211, it is considered that characters may be included in the region formed by the closed line. In this state, the character region candidate line determination unit 1043 detects the color of the region in the detected lines. Thereafter, the character region candidate line determination unit 1043 determines whether the color of the region in the detected lines is substantially the same color (Step S212). When in Step S212 the character region candidate line determination unit 1043 determines that the color in the region is substantially the same color, the character region candidate line determination unit 1043 regards the detected lines as character region candidate lines (Step S213). For example, in the example of FIG. 7A, the vertical lines Lv1 and Lv2, and the horizontal lines Lh1 and Lh2 serve as the character region candidate lines. By the processing of Step S213, a closed curved line can also be detected as a character region candidate line.

After Step S213, or when no closed line is detected in Step S211, or when in Step S212 the color of the region is not substantially the same color, the character region estimation unit 104 ends the processing of FIG. 6, and goes back to the processing of FIG. 4A and FIG. 4B. After the processing returns to the processing of FIG. 4A and FIG. 4B, the controller 202 performs processing of character region candidate determination 2 (Step S105). The processing of character region candidate determination 2 is processing to determine a character region candidate based on the character region candidate lines. The following is explanation of the processing of character region candidate determination 2.

Figure 8:
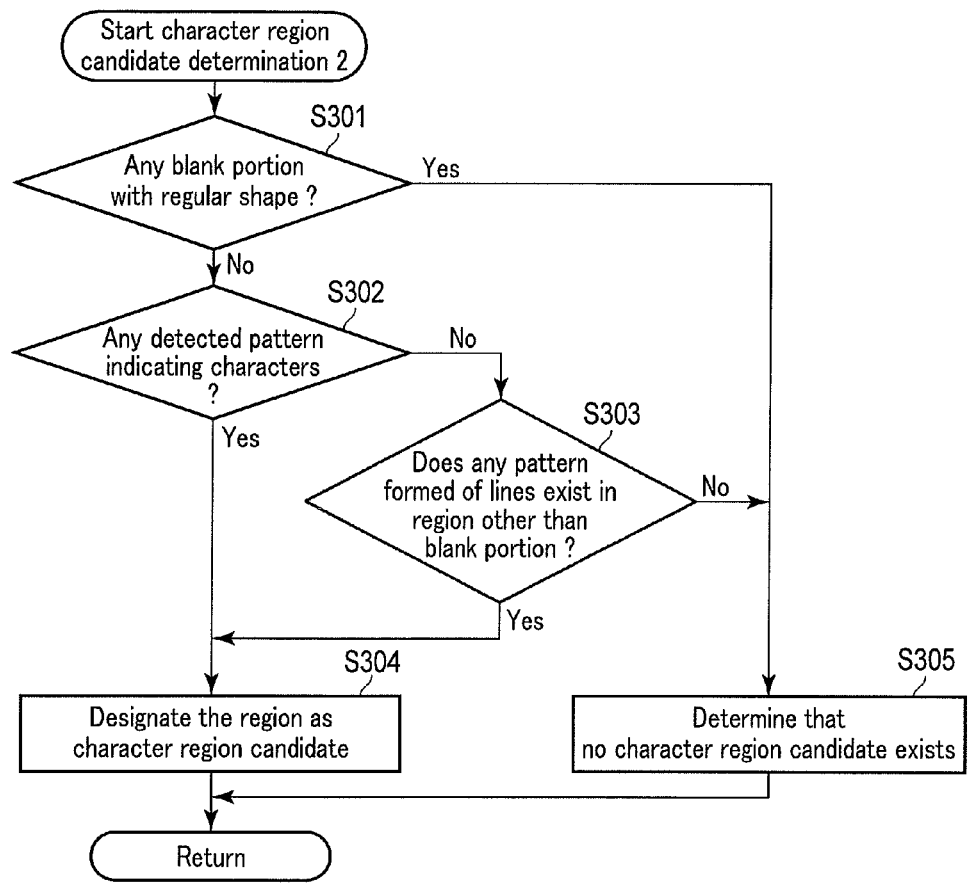
FIG. 8 is a flowchart illustrating processing of character region candidate determination 2.

FIG. 8 is a flowchart illustrating the processing of character region candidate determination 2. The processing of FIG. 8 is also performed by the image processing device 100 of the controller 202. In FIG. 8, the character region candidate estimation unit 1045 in the character region estimation unit 104 determines whether any blank portion (single-gradation portion) having a regular shape in a direction along the character region candidate line exists in the vicinity of the character region candidate lines detected by the character region candidate line determination unit 1043 (Step S301).

Figure 9A:
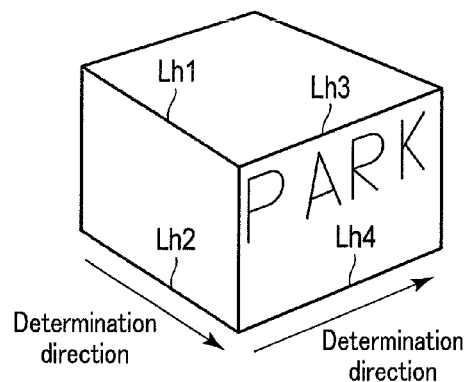
FIG. 9A is a first diagram for explaining the processing of character region candidate determination 2.
Figure 9B:
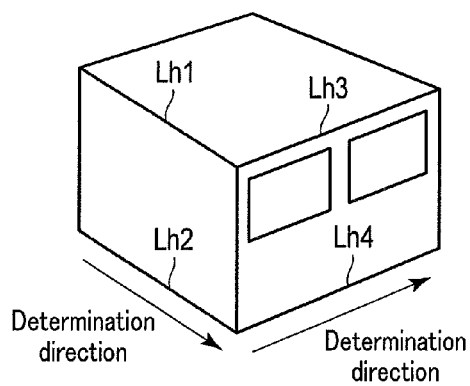
FIG. 9B is a second diagram for explaining the processing of character region candidate determination 2.

As illustrated in FIG. 9A, characters written on a signboard or the like are considered to be arranged along a horizontal direction or a vertical direction of the signboard with high probability. In addition, because characters have various shapes, the portion in which characters are arranged in the image is considered to include no (few) blank portions having a regular shape. Accordingly, the character region candidate estimation unit 1045 determines whether any blank portion having a regular shape in a direction along the character region candidate line exists, as a first determination criterion, and determines the character region candidate in accordance with a result of the determination. In the determination for the stone monument as illustrated in FIG. 9A, determination is performed in the direction along the character region candidate line Lh1 (Lh2) and the direction along the character region candidate line Lh3 (Lh4). In the determination in the direction along the character region candidate line Lh1, the character region candidate estimation unit 1045 determines existence of a blank portion of a regular shape. In the determination in the direction along the character region candidate line Lh3, the character region candidate estimation unit 1045 determines absence of a blank portion of a regular shape, because characters are included. By contrast, in the example of a building having windows as illustrated in FIG. 9B, the character region candidate estimation unit 1045 determines existence of a blank portion of a regular shape, both in the determination in the direction along the character region candidate line Lh1, and in the determination in the direction along the character region candidate line Lh3. The determination performed in this manner enables reduction in the possibility of erroneous determination in which a region including no characters is erroneously regarded as a character region candidate.

In Step S301, when the character region candidate estimation unit 1045 determines absence of a blank portion of a regular shape in a direction along the character region candidate line, the character region candidate estimation unit 1045 determines whether any pattern indicating characters is detected in a region close to the character region candidate line in the image data, with reference to the character dictionary DB 2082 of the recording unit 208 (Step S302). As described above, characters are considered to be arranged along the character region candidate line with high probability. Accordingly, characters will be detected with high probability in a region close to the character region candidate line.

In Step S302, when the character region candidate estimation unit 1045 determines that no pattern indicating characters is detected, the character region candidate estimation unit 1045 determines whether any pattern formed of lines exists in a region close to the blank portion having a regular shape (Step S303). In Step S303, when any pattern formed of lines exists even when the pattern cannot be recognized as characters, the region is considered to include characters.

When in Step S302 the character region candidate estimation unit 1045 determines that a pattern indicating characters is detected, or when in Step S303 the character region candidate estimation unit 1045 determines that any pattern formed of lines exists in a region close to the blank portion having a regular shape, the character region candidate estimation unit 1045 regards the region in which the pattern indicating characters is detected or the region in which the pattern formed of lines is detected, as a character region candidate (Step S304). By contrast, when in Step S301 the character region candidate estimation unit 1045 determines that a blank portion having a regular shape in a direction along the character region candidate line exists, or when in Step S303 the character region candidate estimation unit 1045 determines that no pattern formed of lines exists in a region close to the blank portion of a regular shape, the character region candidate estimation unit 1045 determines that no character region candidate exists (Step S305). After Step S304 or after Step S305, the character region estimation unit 104 ends the processing of FIG. 8, and returns to the processing of FIG. 4A and FIG. 4B.

After the processing returns to the processing of FIG. 4A and FIG. 4B, the controller 202 obtains processing results of character region candidate determination 1 and character region candidate determination 2 from the output unit 106 of the image processing device 100, and determines whether a character region candidate exists in the image data (Step S106), based on the processing results. When in Step S106 the controller 202 determines that a character region candidate exists, the controller 202 displays the portion of the character region candidate in an emphasized state, for example, as illustrated in FIG. 3B (Step S107). In Step S107, because it suffices that the existence of the character region candidate is emphasized, the existence of the character region candidate may be notified of with sound or the like, instead of displaying the portion of the character region candidate in an emphasized state.

When in Step S106 the controller 202 determines that no character region candidate exists, or after Step S107, the controller 202 determines whether a user imaging instruction exists (Step S108). The imaging instruction is, for example, an operation of pressing a release button, or a touch release operation using the touch panel 212. When in Step S108 the controller 202 determines that an imaging instruction exists, the controller 202 executes an imaging operation (Step S109). The imaging operation is an operation of controlling the imaging unit 204 to acquire image data for recording.

After the imaging operation, the controller 202 prepares an image file based on the image data acquired in the imaging unit 204 (Step S110). FIG. 10 illustrates an example of an image file prepared in Step S110. As illustrated in FIG. 10, the image file is divided into an image data portion and a tag information portion. The image data portion stores compressed image data acquired by the imaging operation. The tag information portion stores various information in imaging, such as the imaging place detected by the position detector 216 and the imaging time detected by the timer 218, as metadata.

After preparation of the image file, the controller 202 determines whether any character region candidate exists (Step S111). When in Step S111 the controller 202 determines that a character region candidate exists, the controller 202 displays an association guide 206b as illustrated in FIG. 3C (Step S112) Thereafter, the controller 202 changes the setting of the imaging mode to the association imaging mode (Step S113).

Then, the controller 202 determines whether to turn off the power of the imaging apparatus 200 (Step S114). For example, the controller 202 turns off the power when the power switch is operated to turn off the power or when no operation is performed for a predetermined time. When in Step S114 the controller 202 determines that the power should be turned off, the controller 202 ends the processing of FIG. 4A and FIG. 4B. By contrast, when in Step S114 the controller 202 determines that the power should not be turned off, the controller 202 returns the processing to Step S101.

When in Step S103 the controller 202 determines that the current imaging mode is set to the association imaging mode, the association guide 206b as illustrated in FIG. 3C is displayed. The user views the association guide 206b to recognize the subject including characters in the scene, and makes an imaging instruction, with the imaging apparatus 200 held to easily shoot the character portion, if necessary. To determine the imaging instruction, when the controller 202 determines that the current imaging mode is set to the association imaging mode in Step S103, the controller 202 determines whether an imaging instruction is issued (Step S116). When in Step S116 the controller 202 determines that an imaging instruction is issued, the controller 202 executes an imaging operation (Step S117). After the execution of the imaging operation, the controller 202 recognizes characters in the image data acquired by the imaging operation with the character recognition unit 2024 (Step S118). Thereafter, the controller 202 determines whether characters have been recognized (Step S119).

When in Step S119 the controller 202 determines that characters have not been recognized, the controller 202 determines whether any character recognition candidate has been obtained (Step S120). Even when part of characters cannot be recognized due to a stain or the like, there are cases where whole characters can be estimated from the recognized portion. The processing of Step S120 is processing to determine whether such estimation could be performed.

When in Step S120 the controller 202 determines that no character recognition candidate was obtained, the controller 202 displays a recognition failure message indicating that character recognition ended in failure, on the display unit 206 (Step S121). In addition, also when in Step S120 the controller 202 determines that a character recognition candidate has been obtained, the controller 202 displays a recognition failure message on the display unit 206 (Step S122). Thereafter, the controller 202 displays a list of character recognition candidates on the display unit 206 (Step S123). After displaying the list, the controller 202 determines whether any recognition candidate has been selected by the user (Step S124). In Step 124, when the controller 202 determines that no recognition candidate is selected for a predetermined time, for example, the controller 202 shifts the processing to Step S127.

When the controller 202 determines that characters have been recognized in Step S119 or when the controller 202 determines that any recognition candidate is selected in Step S124, the controller 202 associates the recognized character information with the image file, with the metadata preparation unit 2025 (Step S126). Thereafter, the controller 202 shifts the processing to Step S127. FIG. 11 illustrates an example of an image file associated in Step S120. As illustrated in FIG. 11, the recognized character information is recorded in the tag information portion of the image file.

When the controller 202 determines that no imaging instruction is made in Step S116, or when the controller 202 determines that no recognition candidate is selected for a predetermined time in Step S124, or after Step S126, the controller 202 removes the setting of the association mode (Step S127). Thereafter, the controller 202 shifts the processing to Step S114.

As described above, the present embodiment enables the user to recognize the existence of the subject including characters, such as a signboard in the scene, by determining character region candidate lines from vertical lines or horizontal lines in the image, determining a region in which characters may exist with high probability along the determined character region candidate line as a character region candidate, and presenting information of the character region candidate portion to the user. In addition, when any character region candidate is determined, the imaging mode is set to the association imaging mode. Because the association guide 206b is displayed in the live-view display in the association imaging mode, the present embodiment prompts the user to shoot a signboard or the like in the direction in which characters are easily recognized.

The following is a modification of the present embodiment.

[Modification 1]

In the embodiment described above, the imaging apparatus 200 performs character recognition and, when the imaging apparatus 200 cannot recognize characters, the processing is ended after a recognition failure display is performed. However, character recognition is not always performed with the imaging apparatus 200 alone. Modification 1 illustrates an example in which character recognition is performed in the server 300, when the imaging apparatus 200 cannot recognize characters.

Figure 12A:
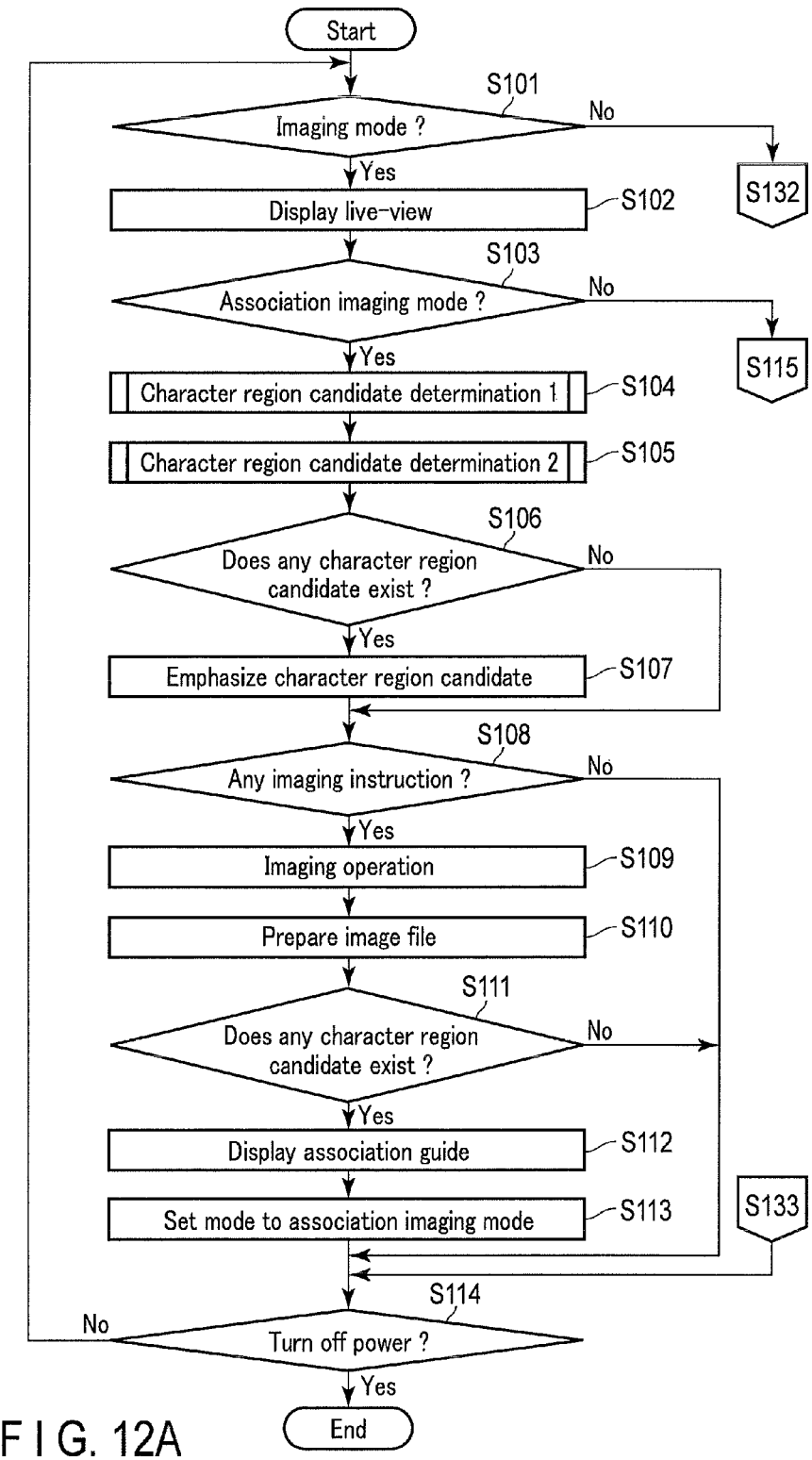
FIG. 12A is a first flowchart illustrating imaging operations of the imaging apparatus according to Modification 1 of an embodiment of the present invention.
Figure 12B:
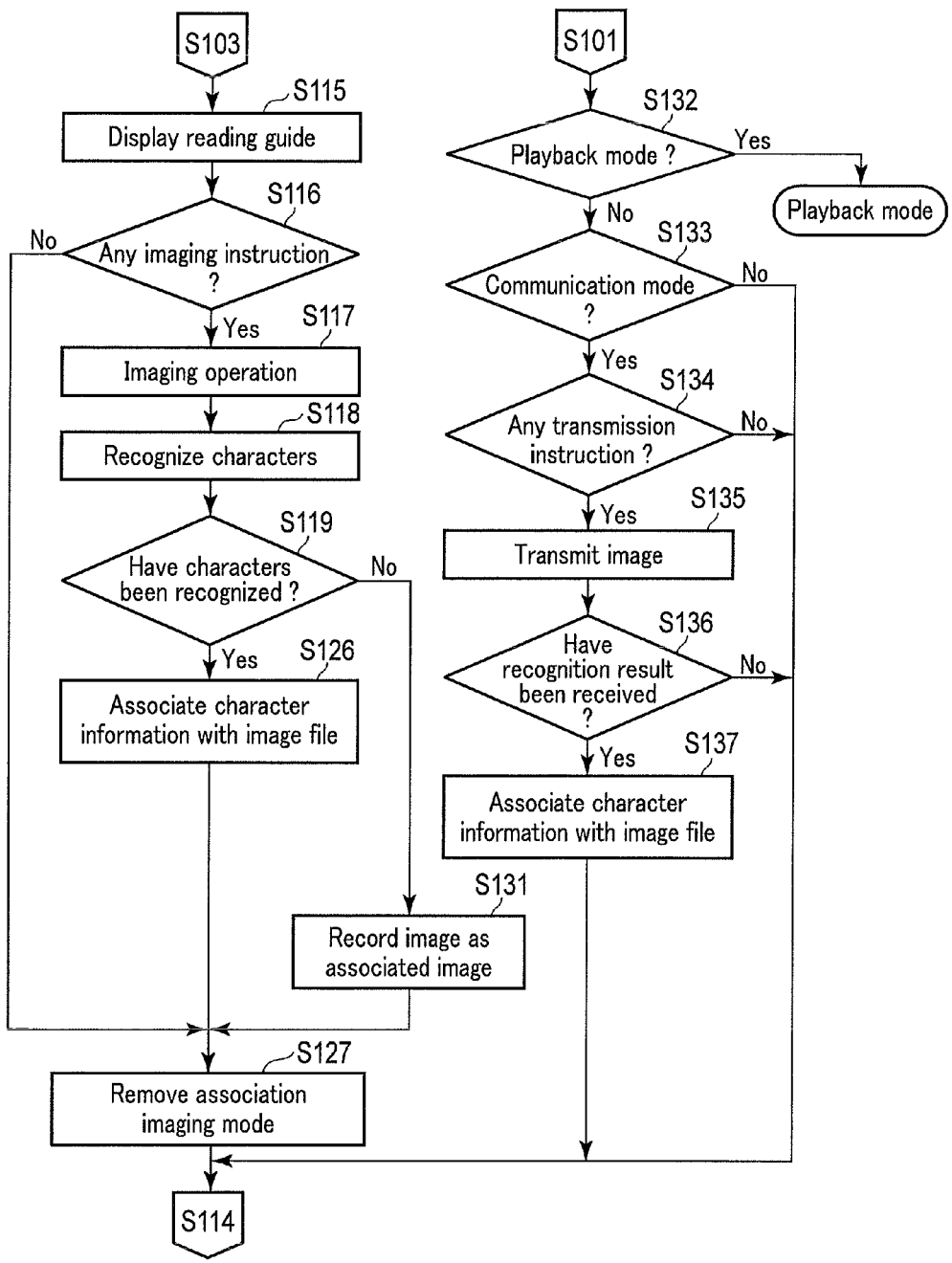
FIG. 12B is a second flowchart illustrating the imaging operations of the imaging apparatus according to Modification 1 of an embodiment of the present invention.

FIG. 12A and FIG. 12B are flowcharts illustrating imaging operations of the imaging apparatus 200 in Modification 1 of the present embodiment. In FIG. 12A and FIG. 12B, the same processing as that in FIG. 4A and FIG. 4B is denoted by the same reference numerals as those in FIG. 4A and FIG. 4B, and explanation thereof is omitted. Specifically, explanation of the processing from Step S101 to Step S117 is omitted. After character recognition in Step S118, the controller 202 determines whether characters have been recognized (Step S119).

When in Step S119 the controller 202 determines that characters have been recognized, the controller 202 associates the recognized character information with the image file, with the metadata preparation unit 2025 (Step S126). By contrast, when the controller 202 determines that no characters have been recognized in Step S119, the controller 202 records the image data of the subject including characters and acquired in the imaging operation of Step S117 as an associated image file for the previously recorded image file in the recording unit 208 (Step S131). Thereafter, the controller 202 shifts the processing to Step S127.

When the controller 202 determines in Step S101 that the operating mode of the imaging apparatus 200 is not the imaging mode, the controller 202 determines whether the operating mode of the imaging apparatus 200 is the playback mode (Step S132). When the controller 202 determines in Step S132 that the operating mode of the imaging apparatus 200 is the playback mode, the controller 202 performs processing of the playback mode. By contrast, when the controller 202 determines in Step S132 that the operating mode of the imaging apparatus 200 is not the playback mode, the controller 202 determines whether the operating mode of the imaging apparatus 200 is the communication mode (Step S133). When the controller 202 determines in Step S133 that the operating mode of the imaging apparatus 200 is not the communication mode, the controller 202 shifts the processing to Step S114.

When the controller 202 determines in Step S133 that the operating mode of the imaging apparatus 200 is the communication mode, the controller 202 determines whether a user's communication instruction has been made (Step S134). A communication instruction is made by the user selecting a desired image file in the communication mode, for example. When the controller 202 determines in Step S134 that no communication instruction is made, the controller 202 shifts the processing to Step S114.

When the controller 202 determines in Step S134 that a communication instruction has been made, the communication controller 2027 of the controller 202 transmits the image file selected by the user to the server 300, with the communication unit 220 (Step S135). When the controller 302 of the server 300 receives an image file, the controller 302 records the received image file in the recording unit 304. In the operation, when the received image file is an association image file, the controller 302 performs character recognition with the character recognition unit 3021. Because the character dictionary DB 3041 mounted on the server 300 has a higher information amount than that of the character dictionary DB 2082 mounted on the imaging apparatus 200, the probability of success in character recognition performed by the server 300 is higher than the probability of success in character recognition performed by the imaging apparatus 200.

After transmission of the image file, the controller 202 determines whether a character recognition result by the server 300 has been received (Step S136). When in Step S136 the controller 202 determines that no character recognition result by the server 300 has been received, the controller 202 shifts the processing to Step S114. When in Step S136 the controller 202 determines that a character recognition result by the server 300 has been received, the controller 202 associates the recognized character information with the image file, with the metadata preparation unit 2025 (Step S137). Thereafter, the controller 202 shifts the processing to Step S114.

Modification 1 explained above has the structure in which, when the imaging apparatus 200 fails in character recognition for the image imaged in the association imaging mode, the image is recorded in the recording unit 208 as an associated image. The associated image is transmitted to the server 300. In this manner, Modification 1 increases the probability of success in character recognition using character recognition with high accuracy by the server 300.

[Modification 2]

Figure 13A:
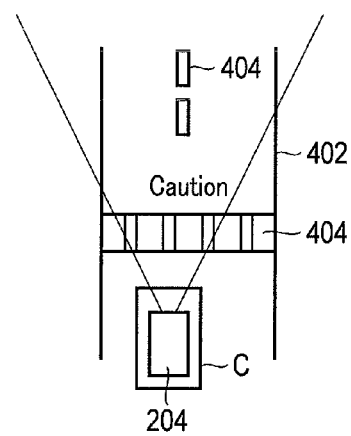
FIG. 13A is a first diagram illustrating Modification 2 for in-vehicle use.

The embodiment and Modification 1 described above mainly illustrate the example in which the imaging apparatus 200 is a portable apparatus such as a digital camera and a smartphone. By contrast, for example, the imaging apparatus 200 may be mounted and used on a vehicle. For example, as illustrated in FIG. 13A, the imaging apparatus 200 may be an imaging unit 204 mounted on a vehicle C in Modification 2. An imaging lens 2041 of the imaging unit 204 has an opening angle α in a predetermined focus position. The imaging unit 204 images the road ahead in running, and determines character region candidate lines and character candidate regions from vertical lines and horizontal lines in an image acquired in imaging.

Figure 13B:
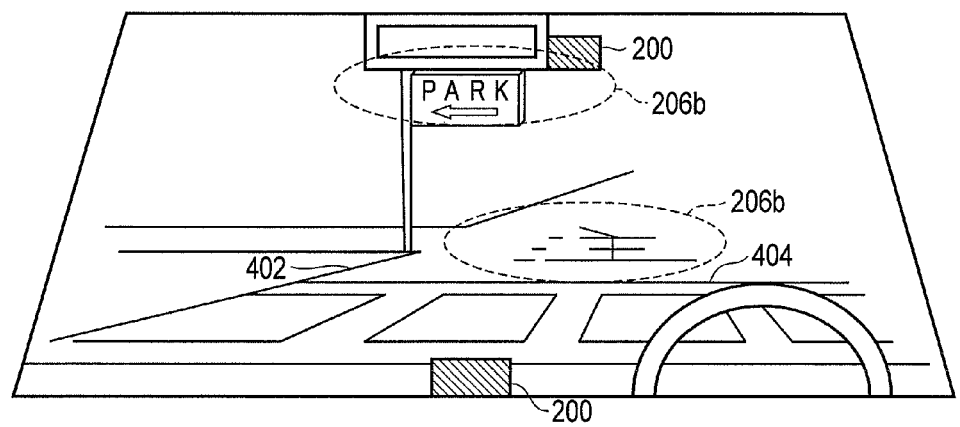
FIG. 13B is a second diagram illustrating Modification 2 for in-vehicle use.

The vehicle C in Modification 2 includes a front mirror with an image display function. The imaging apparatus 200 is disposed in the vicinity of the front mirror, to image the part ahead of the vehicle C. FIG. 13B is a diagram illustrating a portion of the front mirror of the vehicle C. As illustrated in FIG. 13B, when a character region candidate has been determined, the association guide display 206b is performed in the same manner as the embodiment described above. For example, in the example of FIG. 13B, because characters are arranged along a horizontal line connecting two vertical lines in the region of "PARK", the region is recognized as a character region candidate by the method of the present embodiment described above.

In the case of the road, characters may be arranged in the vicinity of white lines 404, such as a crosswalk, with high probability. However, the white lines 404 on the road serve as inclined lines on the image, as illustrated in FIG. 13B. Accordingly, the white lines 404 are not recognized as vertical lines or horizontal lines in the present embodiment. For this reason, in Modification 2, side lines 402 of the road are detected in the image to perform angle correction on the image in accordance with the angle of the side lines 402 in the image and the traveling direction of the vehicle C. In addition, white lines 404 vertical to the side lines 402 are detected in the angle-corrected image, and the white lines 404 are designated as the character region candidate lines. In this manner, the region including the characters "Caution" on the road illustrated in FIG. 13A can be designated as a character region candidate.

The present invention described above based on the embodiment is not limited to the embodiment described above, but may be variously modified or applied within the range of the gist of the present invention, as a matter of course. In the explanation of the operation flowcharts described above, the words "first", "thereafter" and the like used for conveniently explaining the operations do not mean that the operations must be indispensably performed in this order. Although the aspect of the image processing device is emphasized in this explanation, the present invention is applicable to industrial apparatuses and medical apparatuses, as well as consumer use, as an image display apparatus, an inspection apparatus, and a warning apparatus, as a matter of course. At the site of use, various character displays are often made to warn or caution the user, and such characters are usually written in a horizontal direction or a vertical direction. This is also applicable to the case of displaying such characters with a machine or the like, and the same approach explained above can be applied to signboards and signs. In this manner, the present invention is applicable to use in which information which is hard to notice is determined from the image data, to remove oversight, and use to promote re-imaging, re-inspection, and re-observation, as a matter of course. Once characters are read, characters are identified to enable a text-based search with assistance from the Internet or the like through reading of the address. This facilitates support of assistance of further observation and imaging from a third party, and leads to further viewing, observation, and inspection.

Each part of processing in the embodiment described above can be stored as a program that can be executed by the controller 202. The program may be stored and distributed in a storage medium of an external storage device, such as memory card (ROM card, RAM card), a magnetic disk (hard disk), an optical disk (CD-ROM, DVD), and a semiconductor memory. The controller 202 may execute the processing described above by reading the program stored in the storage medium of the external storage device, and being controlled by the read program.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging processing device comprising:
    an imager that acquires an acquired image;
    a controller that comprises a textual character region estimation unit determining a line indicating a direction in which textual characters are arranged with high probability in the acquired image as a textual character region candidate line, and estimating a region in which textual characters are arranged with high probability along the textual character region candidate line as a textual character region candidate;
    a posture detector that determines a posture of the imager based on measurements from one or more sensors; and
    an output that outputs information of the textual character region candidate estimated in the textual character region estimation unit,
    the textual character region estimation unit that comprises:
        a vertical line detector that detects a plurality of vertical lines in the acquired image based on the posture of the imager determined by the posture detector;
        a horizontal line detector that detects a plurality of horizontal lines in the acquired image based on the posture of the imager determined by the posture detector;
        a color distribution detector that detects color distribution between the detected vertical lines or color distribution between the detected horizontal lines; and
        a textual character region candidate line determination unit that determines the textual character region candidate line based on the detected color distribution, and
    the image processing device that includes an association imaging mode to instruct shooting of an additional image of the textual character region candidate in a manner in which the textual characters are recognized.

2. The image processing device according to claim 1, wherein
    the textual character region candidate line determination unit includes a color distribution determination unit for determining whether the detected color distribution between the vertical lines is a substantially equal color distribution, or whether the detected color distribution between the horizontal lines is a substantially equal color distribution, and
    the textual character region candidate line determination unit determines a line connecting end portions of the vertical lines as the textual character region candidate line when the color distribution determination unit determines that the detected color distribution between the vertical lines is a substantially equal color distribution, and determines a line connecting end portions of the horizontal lines as the textual character region candidate line when the detected color distribution between the horizontal lines is a substantially equal color distribution.

3. The image processing device according to claim 1, wherein the textual character region estimation unit further comprises:
    a shadow detector detecting a shadow distribution in a direction along the textual character region candidate line; and
    a textual character region candidate estimation unit estimating the textual character region candidate in accordance with the shadow distribution detected by the shadow detector.

4. The image processing device according to claim 3, wherein
    when the shadow distribution detected by the shadow detector does not include a single-gradation portion having a regular shape and when a region including a pattern indicating textual characters in the direction along the textual character region candidate line is detected or when a region including a pattern formed of lines other than the single-gradation portion is detected, the textual character region candidate estimation unit estimates the region including the pattern indicating the textual characters or the region including the pattern formed of the lines other than the single-gradation portion as the textual character region candidate.

5. The image processing device of claim 1, wherein the controller emphasizes existence of the textual character region candidate in the image in accordance with the information of the textual character region candidate.

6. An image processing method comprising:
    determining a line indicating a direction in which textual characters are arranged with high probability in an acquired image as a textual character region candidate line, in an association imaging mode to cause a user to shoot an additional image of a textual character region candidate;
    estimating a region in which textual characters are arranged with high probability along the textual character region candidate line as the textual character region candidate; and
    outputting information of the estimated textual character region candidate,
    wherein determining the textual character region candidate line includes:
        receiving the acquired image from an imager,
        determining a posture of the imager based on information from one or more sensors, detecting a plurality of vertical lines in the acquired image based on the posture;

detecting a plurality of horizontal lines in the acquired image based on the posture;

detecting a color distribution between the plurality of vertical lines or color distribution between the plurality of horizontal lines; and determining the textual character region candidate line based on the color distribution; and instructing shooting of the additional image of the textual character region candidate in a manner in which the textual characters are recognized.

7. A non-transitory storage medium storing an image processing program to cause a computer to execute:

determining a line indicating a direction in which textual characters are arranged with high probability in an acquired image as a textual character region candidate line, in an association imaging mode to cause a user to shoot an additional image of a textual character region candidate;

estimating a region in which textual characters are arranged with high probability along the textual character region candidate line as the textual character region candidate; and outputting information of the estimated textual character region candidate, wherein determining the textual character region candidate line includes causing the computer to execute:

receiving the acquired image from an imager, determining a posture of the imager based on information from one or more sensors, detecting a plurality of vertical lines in the acquired image based on the posture;

detecting a plurality of horizontal lines in the acquired image based on the posture;

detecting color distribution between the plurality of vertical lines or color distribution between the plurality of horizontal lines; and determining the textual character region candidate line based on the color distribution; and instructing shooting of the additional image of the textual character region candidate in a manner in which the textual characters are recognized.

8. The image processing device according to claim 3, wherein when a region including a pattern formed of lines other than a single-gradation portion is detected, the textual character region candidate estimation unit estimates the region including the pattern formed of the lines other than the single-gradation portion as the textual character region candidate.

9. The image processing device according to claim 3, wherein when the shadow distribution detected by the shadow detector does not include a single-gradation portion having a regular shape and when a region including a pattern indicating textual characters in the direction along the textual character region candidate line is detected, the textual character region candidate estimation unit estimates the region including the pattern indicating the textual characters as the textual character region candidate.

10. The image processing device according to claim 1, further comprising:

a display that displays a portion of the textual character region in an emphasized state.

11. An imaging processing device comprising:

an imager that acquires an image;

one or more sensors that determine a posture of the imager; and a processor communicatively coupled to the imager and the one or more sensors, wherein the processor:

determines a line indicating a direction in which textual characters are arranged with high probability in the image as a textual character region candidate line, detects a plurality of vertical lines in the image based on the posture of the imager determined by the one or more sensors, detects a plurality of horizontal lines in the image based on the posture of the imager determined by the one or more sensors, detects a closed line in the image based on a shape of edges one or more of the plurality of vertical lines or a shape of edges of one or more of the plurality horizontal lines;

detects a color distribution within the closed line, estimates a textual character region candidate based on the color distribution detected, wherein the textual character region is a region in which textual characters are arranged with high probability along the textual character region candidate line, and outputs instructions for shooting of a new image of the textual character region candidate in a manner in which the textual characters are recognized.

* * * * *